(12) United States Patent
McKee et al.

(10) Patent No.: US 9,974,312 B2
(45) Date of Patent: *May 22, 2018

(54) OVEN HAVING A ROTATING DOOR

(71) Applicant: Ovention, Inc., Milwaukee, WI (US)

(72) Inventors: Philip R. McKee, Frisco, TX (US);
Alex Wayne Johnson, Dallas, TX (US)

(73) Assignee: Ovention, Inc., Milwaukee, WI (US)

( * ) Notice: Subject to any disclaimer, the term of this patent is extended or adjusted under 35 U.S.C. 154(b) by 241 days.

This patent is subject to a terminal disclaimer.

(21) Appl. No.: 15/082,562

(22) Filed: Mar. 28, 2016

(65) Prior Publication Data

US 2016/0205948 A1    Jul. 21, 2016

Related U.S. Application Data

(63) Continuation of application No. 14/045,257, filed on Oct. 3, 2013, now Pat. No. 9,326,639, which is a
(Continued)

(51) Int. Cl.
*A21B 1/26* (2006.01)
*A21B 1/42* (2006.01)
(Continued)

(52) U.S. Cl.
CPC ............. *A21B 1/42* (2013.01); *A21B 1/245* (2013.01); *A21B 1/26* (2013.01); *A21B 1/44* (2013.01);
(Continued)

(58) Field of Classification Search
CPC ............ A21B 1/42; A21B 1/44; F24C 15/322
(Continued)

(56) References Cited

U.S. PATENT DOCUMENTS 2,920,177 A    1/1960   Brane
3,169,520 A    2/1965   Smith et al.
(Continued)

FOREIGN PATENT DOCUMENTS

AU    B-41211-85    10/1985
CN    1301477 A    6/2001
(Continued)

OTHER PUBLICATIONS

International Search Report of PCT/US2014/058836 dated Jan. 7, 2015.
(Continued)

*Primary Examiner* — Gregory Huson
*Assistant Examiner* — Nikhil Mashruwala
(74) *Attorney, Agent, or Firm* — Quarles & Brady LLP (57) ABSTRACT

An oven comprising a housing, a cavity located within the housing, and a rotator having a first food loading section and a second food loading section is disclosed. The cavity includes a single opening for loading a food item into the cavity. If one of the first food loading section and the second food loading section is located outside of said cavity, then the other of the first food loading section and the second food loading section is located within said cavity. A first cook setting of the oven when the first food loading section is within the cavity and a second cook setting of the oven when the second food loading section is within the cavity are independently controllable. The first food loading section and the second food loading section may be separated by a divider, which prevents heat from escaping from the cavity through the opening.

13 Claims, 8 Drawing Sheets

Related U.S. Application Data continuation-in-part of application No. 13/774,617, filed on Feb. 22, 2013, now Pat. No. 8,746,134, and a continuation-in-part of application No. 13/236,695, filed on Sep. 20, 2011, now Pat. No. 8,733,236, and a continuation-in-part of application No. 13/077,143, filed on Mar. 31, 2011, now Pat. No. 9,288,997.

(51) Int. Cl.
| | |
|---|---|
| *A47J 37/04* | (2006.01) |
| *A47J 37/06* | (2006.01) |
| *F24C 15/32* | (2006.01) |
| *A21B 1/24* | (2006.01) |
| *A21B 1/44* | (2006.01) |
| *A21B 3/07* | (2006.01) |

(52) U.S. Cl.
CPC ............... *A21B 3/07* (2013.01); *A47J 37/049* (2013.01); *A47J 37/067* (2013.01); *F24C 15/322* (2013.01)

(58) Field of Classification Search
USPC ......... 126/21 A, 21 R, 25 R, 41 A; 219/388, 219/389, 400; 99/443 C, 448
See application file for complete search history.

(56) References Cited

U.S. PATENT DOCUMENTS

| | | | |
|---|---|---|---|
| 3,910,175 A | 10/1975 | Smith | |
| 4,037,070 A * | 7/1977 | Kirpichnikov | H05B 6/6411 219/701 |
| 4,244,284 A | 1/1981 | Flavan, Jr. et al. | |
| 4,506,652 A | 3/1985 | Baker et al. | |
| 4,556,043 A | 12/1985 | Bratton | |
| 4,924,763 A | 5/1990 | Bingham | |
| 4,951,648 A | 8/1990 | Shukla et al. | |
| 5,153,402 A | 10/1992 | Quick et al. | |
| 5,277,105 A | 1/1994 | Bruno et al. | |
| 5,305,468 A | 4/1994 | Bruckert et al. | |
| 5,365,918 A | 11/1994 | Smith et al. | |
| 5,398,666 A | 3/1995 | Smith et al. | |
| 5,404,978 A | 4/1995 | Hagiwara | |
| 5,558,793 A | 9/1996 | McKee et al. | |
| 5,717,192 A | 2/1998 | Dobie et al. | |
| 5,771,786 A | 6/1998 | Chung | |
| 5,826,496 A | 10/1998 | Jara | |
| 5,927,265 A | 7/1999 | McKee et al. | |
| 6,140,626 A | 10/2000 | McKee et al. | |
| 6,369,360 B1 | 4/2002 | Cook | |
| RE37,706 E | 5/2002 | Chung | |
| 6,541,739 B2 | 4/2003 | Shei et al. | |
| 6,880,545 B2 | 4/2005 | Heber et al. | |
| 6,956,191 B2 | 10/2005 | Han et al. | |
| 6,998,582 B1 | 2/2006 | Maroti | |
| 7,004,159 B1 | 2/2006 | Carpenter et al. | |
| 7,381,927 B1 | 6/2008 | Agnello | |
| 8,124,920 B1 | 2/2012 | Weber | |
| 8,253,084 B2 | 8/2012 | Toyoda et al. | |
| 8,733,236 B2 | 5/2014 | McKee | |
| 8,746,134 B2 | 6/2014 | McKee | |
| 9,288,997 B2 | 3/2016 | McKee | |
| 9,326,639 B2 | 5/2016 | McKee et al. | |
| 9,480,364 B2 | 11/2016 | McKee et al. | |
| 9,681,773 B2 * | 6/2017 | McKee | A47J 37/041 |
| 2002/0121509 A1 | 9/2002 | Shei et al. | |
| 2004/0144260 A1 | 7/2004 | Backus et al. | |
| 2005/0132899 A1 | 6/2005 | Huang et al. | |
| 2005/0205547 A1 | 9/2005 | Wenzel | |
| 2007/0137633 A1 | 6/2007 | McFadden | |
| 2007/0295325 A1 | 12/2007 | Esparza et al. | |
| 2008/0067166 A1 | 3/2008 | Yoder et al. | |
| 2008/0156201 A1 | 7/2008 | Cook | |
| 2008/0216812 A1 | 9/2008 | Dougherty | |
| 2009/0090252 A1 | 4/2009 | Ewald et al. | |
| 2010/0193500 A1 | 8/2010 | Moreth, III | |
| 2010/0282742 A1 | 11/2010 | Uchiyama | |
| 2011/0114634 A1 | 5/2011 | Nevarez | |
| 2012/0247445 A1 | 10/2012 | McKee | |
| 2013/0068211 A1 | 3/2013 | McKee | |
| 2013/0202761 A1 | 8/2013 | McKee | |
| 2013/0213380 A1 | 8/2013 | McKee | |
| 2013/0239822 A1 | 9/2013 | McKee | |
| 2014/0033932 A1 | 2/2014 | McKee et al. | |
| 2015/0164271 A1 | 6/2015 | McKee | |
| 2017/0332646 A1 * | 11/2017 | Johnson | A21B 3/07 |

FOREIGN PATENT DOCUMENTS

| | | |
|---|---|---|
| EP | 0587463 A1 | 3/1994 |
| WO | 2013043285 A1 | 3/2013 |
| WO | 2016141009 A1 | 9/2016 |

OTHER PUBLICATIONS

Written Opinion of PCT/US2014/058836 dated Jan. 7, 2015.
International Search Report for PCT/US2012/051276 dated Nov. 2, 2012.
Supplemental European Search Report for PCT/US2012/051276 dated Mar. 19, 2015.
International Search Report for PCT/US2012/051276 dated Feb. 11, 2012.
International Search Report for PCT/US2016/020348 dated May 31, 2016.
Written Opinion of International Searching Authority for PCT/US2016/020348 dated May 31, 2016.
Extended European Search Report for EP 14850176.0 dated Jul. 24, 2017.

* cited by examiner

OVEN HAVING A ROTATING DOOR

CROSS REFERENCE TO RELATED APPLICATIONS

This application is a continuation of U.S. application Ser. No. 14/045,257, filed on Oct. 3, 2013, which is a continuation-in-part of U.S. application Ser. No. 13/077,143, filed on Mar. 31, 2011, now U.S. Pat. No. 9,288,997, a continuation-in-part of U.S. application Ser. No. 13/236,695, filed on Sep. 20, 2011, now U.S. Pat. No. 8,733,236, and a continuation-in-part of U.S. application Ser. No. 13/774,617, filed on Feb. 22, 2013, now U.S. Pat. No. 8,746,134, the contents of all of which are incorporated herein by reference.

FIELD OF INVENTION

The present invention relates to ovens in general, and in particular to an oven having a rotating door, wherein the oven is capable of providing continuous food cooking while minimizing heat loss.

BACKGROUND OF THE INVENTION

A conveyor oven typically has a first opening through which uncooked food enters and a second opening at the opposite end of the oven through which cooked food exits. A stainless steel conveyor belt is commonly used to carry food items from a loading platform through a heated cavity between the first and second openings and ultimately onto an unloading platform. The conveyor belt extends past both openings sufficiently to allow safe insertion and retrieval of food items from the loading and unloading platforms. This arrangement allows food items to be placed on the conveyor belt on a continuous basis to achieve sequential steady state cooking. The only limit to how many substantially identical food items may be placed in the conveyor oven is the speed of the conveyor belt, which correlates to the residence time inside the heated cavity for food items to be sufficiently cooked.

When food items offered by a commercial foodservice operation such as a restaurant are to be cooked at the same temperature for the same amount of time in a relatively large kitchen area, a conveyor oven is particularly advantageous. The operator needs to only set the temperature, blower speed and conveyor belt speed as necessary to cook the selected foods. Once these three parameters are set, the oven may be operated continuously without any further adjustments. Even a person unskilled in the art of cooking is able to prepare high quality cooked food products simply by placing them on the loading platform of a conveyor oven. The ease of operation and high throughput make conveyor ovens highly desirable in restaurants and other commercial food service settings that have sufficient space to accommodate them.

However, conveyor ovens also have their disadvantages. For example, most commercial foodservice operations offer a variety of different food items, such as pizza, chicken, vegetables and pie, which require a wide range of cooking times and heat transfer profiles. Even a single food order at a restaurant may include a variety of food items, and different food items require different cooking times, temperatures and blower speeds. Conveyor ovens are very efficient when cooking similar food items, but not for cooking a variety of food items that require vastly different cooking times and heat transfer profiles. In addition, the two openings contribute to tremendous heat loss during the operation of conveyor ovens. The lost heat must be replaced in order to maintain cook temperature, and as a result conveyer ovens are not energy efficient. Furthermore, the space required by the loading and unloading platforms of conveyor ovens limit the application of conveyor ovens to relatively large commercial kitchens.

Consequently, it would be desirable to provide a reduced footprint oven with the efficiency of conveyor ovens while enabling different cooking times and temperatures, and without the large amount of heat loss associated with conveyor ovens.

BRIEF DESCRIPTION OF THE DRAWINGS

The invention itself, as well as a preferred mode of use, further objects, and advantages thereof, will best be understood by reference to the following detailed description of illustrative and exemplary embodiments when read in conjunction with the accompanying drawings, wherein.

SUMMARY OF THE INVENTION

It has now been found that the above and related objects of the present invention are obtained in the form of several related aspects, including an oven having a rotating door.

More particularly, the present invention relates to an oven comprising a housing, a cavity located within the housing, a rotator comprising a first food loading section and a second food loading section, and a heat source for providing heat to the cavity. The cavity includes a single opening for loading a food item into the cavity. When one of the first food loading section and the second food loading section is located outside of said cavity, the other of the first food loading section and the second food loading section is located within said cavity. A first cook setting of the oven when the first food loading section is within the cavity and a second cook setting of the oven when the second food loading section is within the cavity are independently controllable. The first food loading section and the second food loading section may be separated by a divider, which prevents heat from escaping from the cavity through the opening. The divider may be removable. The oven may further comprise a motor for rotating the rotator.

The present invention also relates to an oven comprising a housing, a cavity located within the housing, a rotatable surface, a controller, and a heat source for providing heat to the cavity. The cavity includes a single opening for loading a food item into the cavity. When a first half of the surface is located substantially within the cavity, a second half of the surface is located substantially outside the cavity. When the first half of the surface is located substantially outside the cavity, the second half of the surface is located substantially within the cavity. The controller applies a first cook setting to the oven when the first half of the surface is within the cavity and a second cook setting to the oven when the second half of the surface is within the cavity, wherein the first cook setting and the second cook setting can be independent of each other. The controller may comprise a first control panel for entering the first cook setting and a second control panel for entering the second cook setting. The oven may further comprise a divider placed on the surface for separating the first half and the second half of the surface, wherein the divider prevents heat from escaping from the cavity through the opening. The divider may be removable. The oven may further comprise a motor for rotating the surface.

All features and advantages of the present invention will become apparent in the following detailed written description.

DETAILED DESCRIPTION OF PREFERRED EMBODIMENTS

Figure 1:
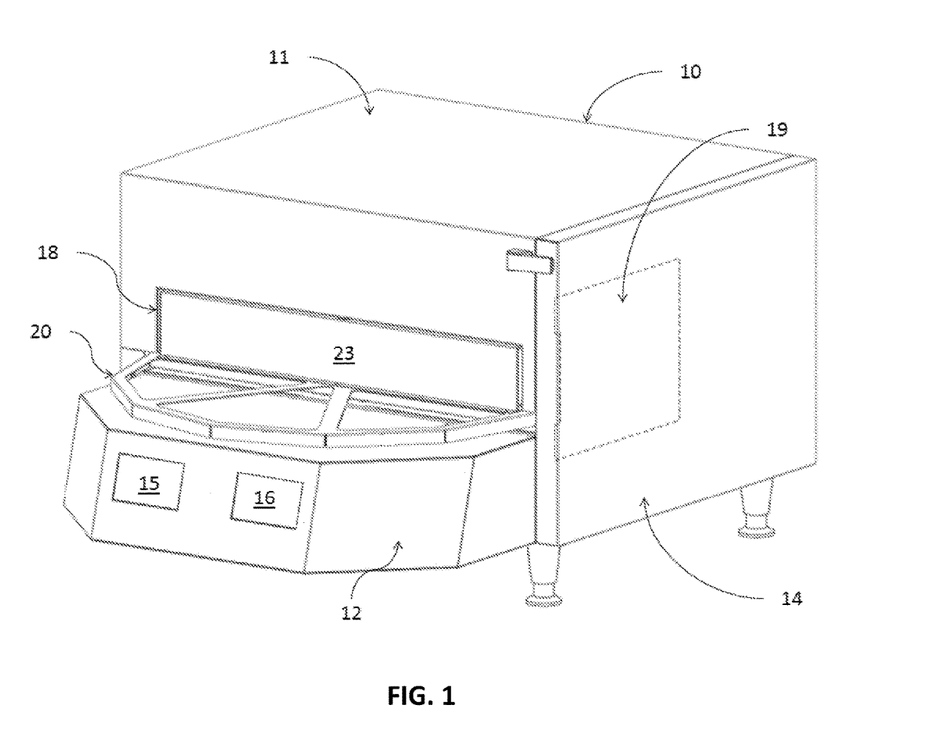
FIG. 1 is an isometric view of an oven, in accordance with an exemplary embodiment of the present invention.

Referring now to the drawings and in particular to FIG. 1, there is depicted an isometric view of an oven, in accordance with a preferred embodiment of the present invention. As shown, an oven 10 includes a housing 11 and a base 12. Housing 11 includes a single front opening 18 for loading a food item into the oven. In addition, the housing 11 may also include a side opening 19 for maintenance purposes. During cooking operations, front opening 18 can be covered by a divider 23 located on a rotator 20, and side opening 19 can be covered by a side door 14.

Base 12 includes a first control panel 15 and a second control panel 16. First and second control panels 15, 16 may be implemented with touchscreens. They can also be implemented with keypads, liquid crystal displays (LCDs), and/or other means for entering cook settings. An operator can enter commands and/or cook setting parameters, such as cooking temperature, cooking time, blower speed, etc., via first and second control panels 15, 16 to effectuate cooking controls on any food items placed within oven 10.

Figure 2A:
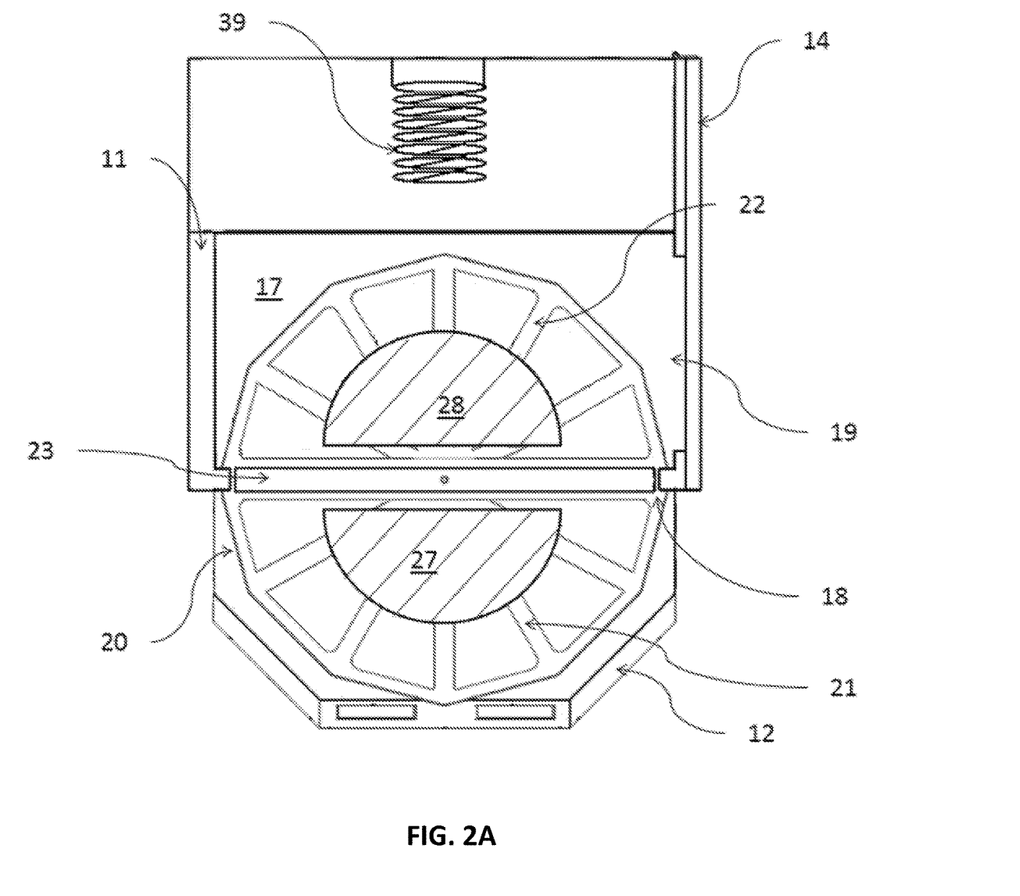
FIGS. 2A-2B are top and front cross sectional views of a housing for the oven from FIG. 1, in accordance with an exemplary embodiment of the present invention.
Figure 2B:
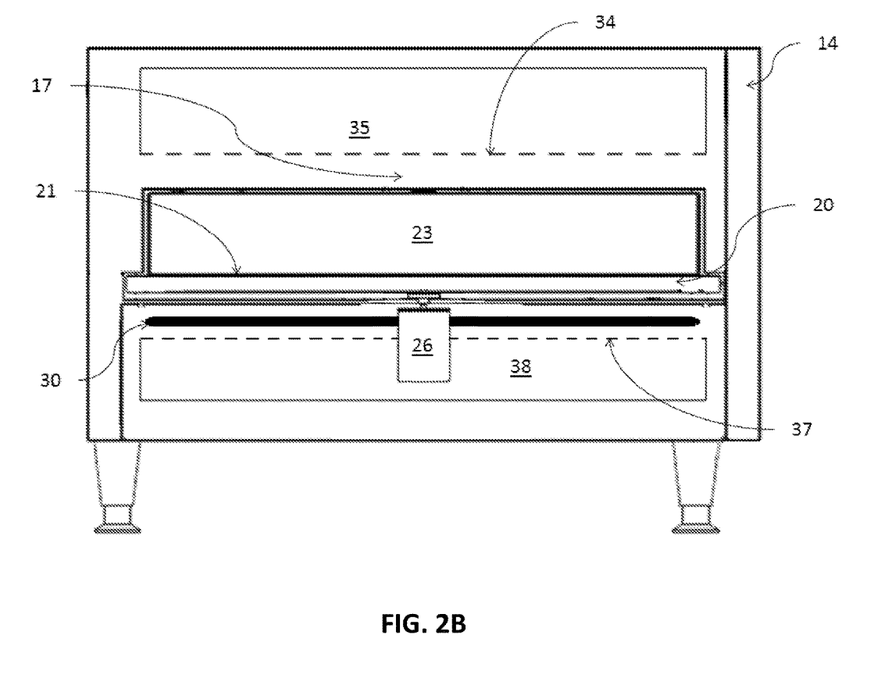

With reference now to FIGS. 2A-2B, there are depicted top and front cross sectional views of housing 11, in accordance with a preferred embodiment of the present invention. As shown, housing 11 accommodates a cavity 17 and rotator 20 that supports a first food loading section 21 and a second food loading section 22. Preferably, the surface of the rotator 20 forming or supporting the first and second food loading sections 21, 22 is substantially symmetric in 180° rotation. For example, as shown in FIG. 2A, the first and second food loading sections 21, 22 together form a dodecagon (regular 12-sided polygon). In another example, the first and second food loading sections 21, 22 may be in semi-circular shapes, which together form a complete circular shape. The surfaces of first and second food loading sections 21, 22 may be substantially planar. When one of the first and second food loading sections 21, 22 is rotated into within the cavity 17 for cooking operation, the other one of the first and second food loading sections is located outside of the cavity 17 (e.g., in ambient air of a kitchen). First and second food loading sections 21, 22 are configured to receive cooking plates 27, 28, respectively. Any food item intended to be cooked by oven 10 may be initially placed on either one of cooking plates 27, 28, though it will be readily apparent to those skilled in the art that certain food items may be placed directly on food loading sections 21, 22. Cooking plates 27, 28 can be identical or different from each other, depending on the types of food items to be prepared. Thus, cooking plate 27 may be made of a different material and/or a different design from cooking plate 28.

Divider 23 serves as a divider between first and second food loading sections 21, 22 as well as an oven cover to prevent heat from escaping from cavity 17 through front opening 18, depending on the placement of divider 23 in relation to front opening 18. Cavity 17 can be conveniently accessed via side opening 19 that can be covered by side door 14. (See, e.g., FIG. 3B).

In various embodiments, the divider 23 may be removable from the rotator 20 to provide a larger food loading area on the surface of the rotator 20 so that a large food item, such as a large circular pizza, can be placed and cooked. In such configuration, the energy saving feature of the divider 23 would be traded off for the ability to cook a large food item. For example, this could be of particular benefit to commercial foodservice operations, such as a convenience store, which may need to cook several different types of food items but have only a small footprint available for cooking equipment to do so. This feature of a removable divider 23 would enable the oven 10 to be used for different purposes—for example, to cook a large food item with divider 23 removed from the rotator 20 or to cook different types of smaller food items with divider 23 placed on the rotator 20.

In accordance with a preferred embodiment of the present invention, the cook setting for the oven 10 when the first food loading section 21 is located within the cavity 17 and the cook setting for the oven 10 when the second food loading section 22 is located within the cavity 17 may be independently controllable (e.g., via a controller, one or more control panels 15 and 16). In other words, the cook setting for cooking a food item placed on the first food loading section 21 when it is located within the cavity 17 can be different from the cook setting for cooking a food item placed on the second food loading section 22 when it is located within the cavity 17. Examples of cook setting parameters include, without limitation, cooking time, cooking temperature or a pre-set sequence of different cooking temperatures, blower speed, the type(s) of heating element to be used during cooking operation (e.g., pressurized hot air stream, microwave heating, infrared radiation heating, depending on its availability in the oven 10), and/or any other cooking condition that can be set or provided by the oven 10.

In addition, the oven 10 may be pre-programmed with a separate and independent cook setting before each of the first and second food loading sections 21, 22 rotates into the cavity for cooking operation. For example, operating parameters for the oven 10 to cook any food items placed on food loading section 21 to be rotated into cavity 17 through the opening 18 can be entered at first control panel 15 (from FIG. 1). Similarly, operating parameters for the oven 10 to cook any food items placed on food loading section 22 to be rotated into the cavity 17 through the opening 18 can be entered at second control panel 16 (from FIG. 1).

When food loading section 21 is located inside cavity 17 where food is being cooked, food loading section 22 is located outside cavity 17 where it is being cooled by, for example, the ambient air of a kitchen in which the oven 10 may reside. Similarly, when food loading section 22 is located inside cavity 17 where food is being cooked, food loading section 21 is located outside cavity 17 where it is being cooled by the ambient air of the kitchen in which the oven 10 may reside. Due to the large temperature differential between the cooled food loading section 21 (or food loading section 22) and heated cavity 17, food loading section 21 (or food loading section 22) can be sent into cavity 17 to rapidly bring down the temperature of cavity 17, when necessary, after food loading section 21 (or food loading section 22) has been sufficiently cooled down by the ambient air. In essence, the air-cooled food loading section 21 (or food loading section 22) serves as a heat sink for absorbing the heat within cavity 17. From a time-saving standpoint, this maneuver is particularly advantageous in getting the oven 10 ready for cooking a food item that requires a lower cooking temperature than the current temperature of cavity 17. This is because it takes less time to raise the temperature of cavity 17 up to the desired temperature by the heating and airflow system (after cavity 17's current temperature has been lowered by one of food loading sections 21-22) than to lower cavity 17's current temperature down to the desired temperature by allowing heat to escape from cavity 17.

Rotator 20 can be driven by a stepper motor 26 that provides the rotational movement for rotator 20. Although rotator 20 is shown to be moved by a stepper motor, it is understood by those skilled in the art that rotator 20 can also be rotated manually and/or by a variety of other motorized movement designs.

Oven 10 includes a heating and airflow system to supply heat to cavity 17 for heating up any food items that have been carried into cavity 17 from front opening 18 via rotator 20. As shown in FIG. 2B, the heating and airflow system may include a top plenum 35 and a bottom plenum 38. Top plenum 35 is connected to a top nozzle plate 34. Bottom plenum 38 is connected to a bottom nozzle plate 37. Heated air in top plenum 35 and bottom plenum 38 are in gaseous communication with cavity 17 through top nozzle plate 34 and bottom nozzle plate 37, respectively. Each of top nozzle plate 34 and bottom nozzle plate 37 includes one or more conical shape nozzles for directing hot pressured airstream towards any food items placed on the portion of rotator 20 located within cavity 17.

For additional heating, a heating element 30, such as an infrared radiation heating element, can be placed within cavity 17 somewhere between rotator 20 and bottom nozzle plate 37 (as shown in FIG. 2B) or between rotator 20 and top nozzle plate 34 for supplying heat towards any food located on first loading section 21 or second loading section 22 of rotator 20 within cavity 17. It is understood by those skilled in the art that other heating elements, such as microwave, steam or a combination thereof, can be used instead of infrared radiation heating element.

Figure 3A:
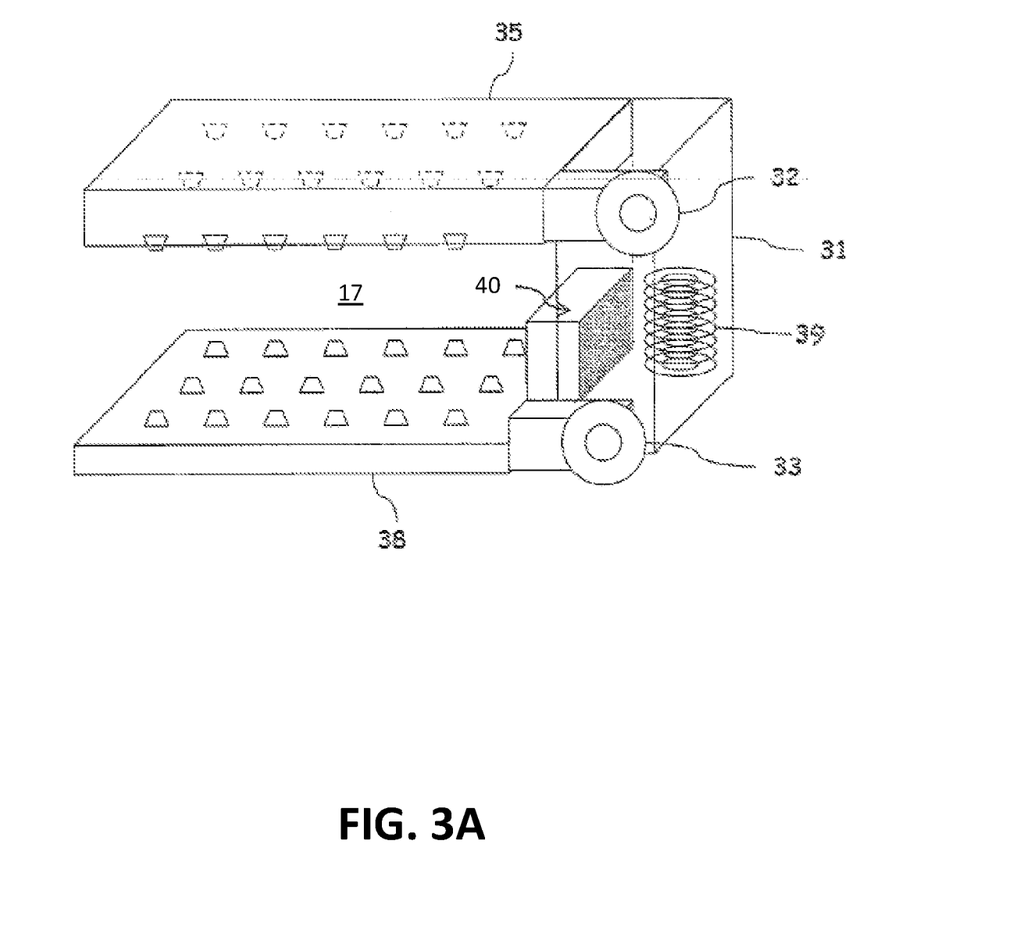
FIG. 3A is a diagram of a heating and airflow system within the oven from FIG. 1, in accordance with an exemplary embodiment of the present invention.

Referring now to FIG. 3A, there is depicted a diagram of the heating and airflow system within the oven 10, in accordance with a preferred embodiment of the present invention. Air within cavity 17 is initially pumped in to a heater plenum 31 via an intake opening 40. Heater plenum 31 includes a heater 39 (which is also shown in FIG. 2A). After it has been sufficiently heated by heater 39, the hot air is then directed to top plenum 35 via a top blower 32 and to bottom plenum 38 via a bottom blower 33. The pressurized hot air formed within top plenum 35 is subsequently directed to cavity 17 via multiple nozzles located on top nozzle plate 34 (from FIG. 2B). Similarly, pressurized hot air formed within bottom plenum 38 is subsequently directed to cavity 17 via multiple nozzles located on bottom nozzle plate 37 (from FIG. 2B). Although heated air is shown to be sent to top plenum 35 and bottom plenum 38 via separate blowers, it is understood by those skilled in the art that heated air can be sent to both top plenum 35 and bottom plenum 38 via a single blower.

Figure 3B:
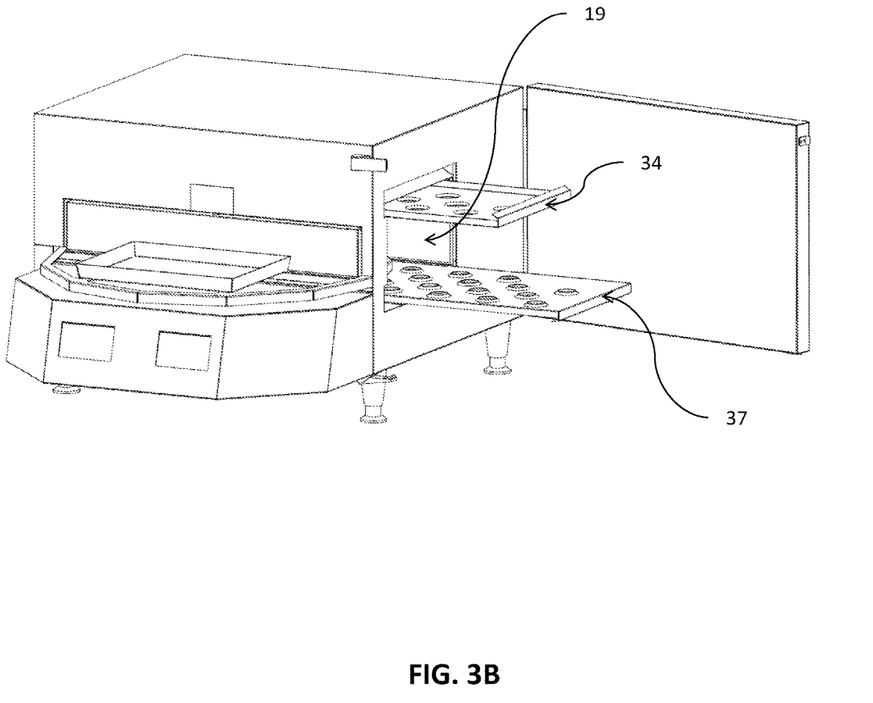
FIG. 3B is a diagram of top and bottom nozzle plates within the oven from FIG. 1, in accordance with an exemplary embodiment of the present invention.

Top nozzle plate 34 and bottom nozzle plate 37 can be removed from cavity 17 via side opening 19, as shown in FIG. 3B. Although air passes through top nozzle plate 34 and bottom nozzle plate 37 into cavity 17, it is understood by those skilled in the art that top plenum 35 or bottom plenum 38 can be in gaseous communication through a variety of air opening configurations such as tubes, rectangular openings and the like. Moreover, air could enter cavity 17 only through top plenum 35 or only through bottom plenum 38.

Preferably, the diameter of the openings of nozzles on top and bottom nozzle plates 34, 37 may range from ¼" to 1.3". Each of the nozzles can provide a pressurized hot airstream of about 1" to 3" diameter coverage directed towards any food items placed on the portion of rotator 20 located approximately 4" from top nozzle plate 34 or bottom nozzle plate 37. After a food item has been placed within cavity 17, rotator 20 can stop moving, and pressurized hot airstreams can be directed towards the food item placed on rotator 20 to begin the cooking process. At this point, rotator 20 may oscillate in a slight clockwise and counter-clockwise fashion in order to increase the hot airstream coverage on the food item on rotator 20, and to avoid overheating of a food item at any spot located directly underneath and/or above one of the nozzles. For example, rotator 20 may oscillate clockwise and counter-clockwise within the width of the divider 23 so that the edges of the divider 23 do not go beyond the opening 18. In another example, rotator 20 may oscillate between 5° clockwise from the stopping point and 5° counter-clockwise from the stopping point. It will be appreciated by those skilled in the art that the placement of nozzles in top nozzle plate 34 and also the placement of nozzles in bottom nozzle plate 37 will be selected such that the slight clockwise and anti-clockwise movements by rotator 20 will be sufficient to travel the left to right distance between individual nozzles in top nozzle plate 34 and bottom nozzle plate 37.

Figure 4A:
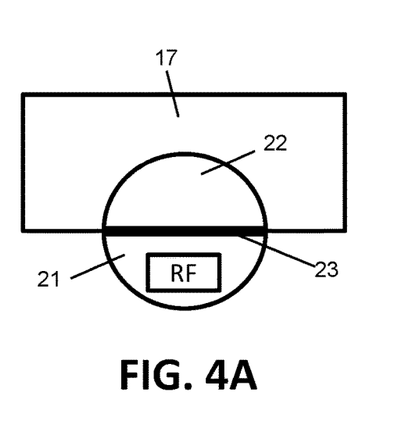
FIGS. 4A-4C illustrate a method of cooking when only one of food loading sections of the oven from FIG. 1 is being used, in accordance with an exemplary embodiment of the present invention.
Figure 4B:
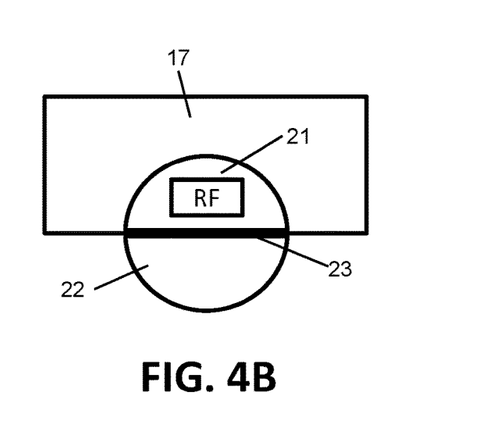
Figure 4C:
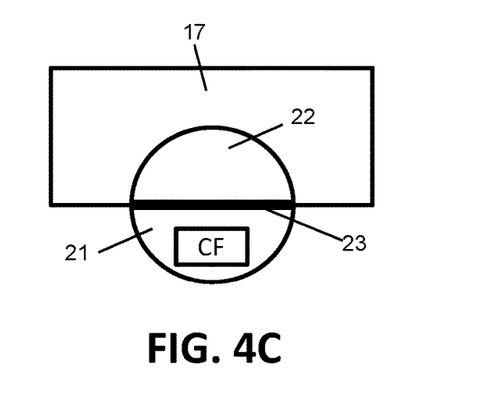

With reference now to FIGS. 4A-4C, there are illustrated schematically a method of cooking when only one of food loading sections 21, 22 of rotator 20 is used, in accordance with a preferred embodiment of the present invention. An uncooked raw food item (RF) is initially placed on food loading section 21 (or 22), as shown in FIG. 4A. An operator then enters an appropriate cook settings for cooking the food item via control panel 15 (or 16), and food loading section 21 (or 22) is subsequently rotated into and located within cavity 17, as depicted in FIG. 4B. After a period of time has lapsed, food loading section 21 (or 22) exits cavity 17, and the fully cooked food item (CF) is ready to be removed from food loading section 21 (or 22) by an operator, as shown in FIG. 4C.

Figure 5A:
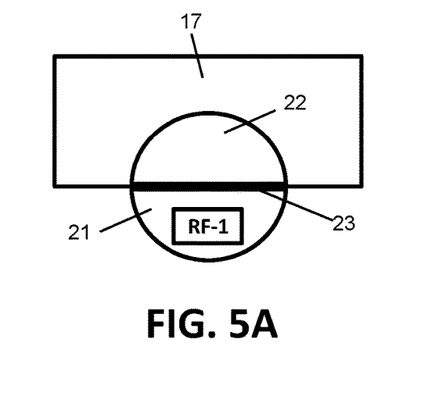
FIGS. 5A-5F illustrate a method of cooking when both food loading sections of the oven from FIG. 1 are being used, in accordance with an exemplary embodiment of the present invention.
Figure 5B:
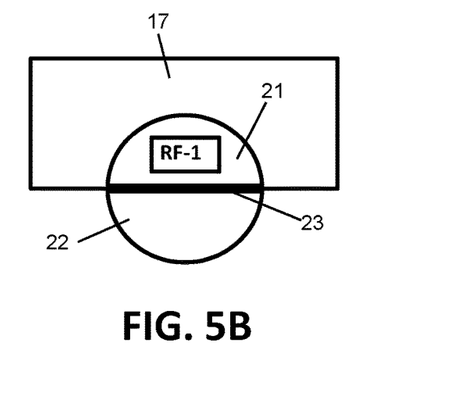
Figure 5C:
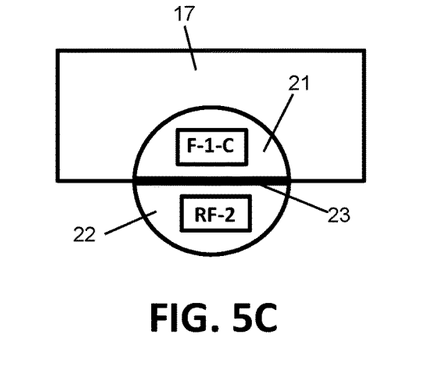
Figure 5D:
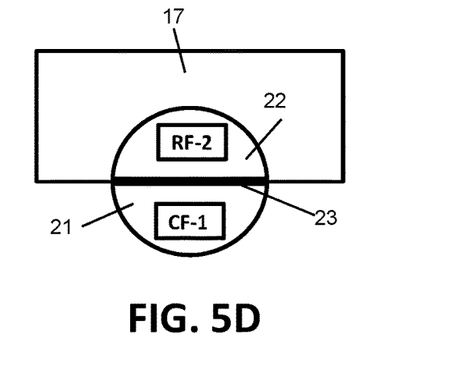
Figure 5E:
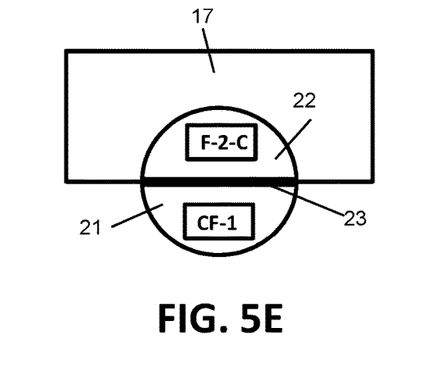

Referring now to FIGS. 5A-5F, there are illustrated schematically a method of cooking when both food loading sections 21, 22 of rotator 20 are being used, in accordance with a preferred embodiment of the present invention. A first uncooked raw food item (RF-1) is initially placed on food loading section 21, and an operator then enters an appropriate cook settings for cooking the first food item via control panel 15, as shown in FIG. 5A. Food loading section 21 is subsequently rotated inside cavity 17, as depicted in FIG. 5B. While the first food item is being cooked (F-1-C), a second uncooked raw food item (RF-2) can be placed on food loading section 22, and the operator enters an appropriate cook settings for cooking the second food item via control panel 16, as depicted in FIG. 5C. After a period of time has lapsed, food loading section 21 on which the first food item is fully cooked (CF-1) exits cavity 17 while food loading section 22 is being rotated inside cavity 17, as shown in FIG. 5D. While the second food item is being cooked (F-2-C), the fully cooked first food item (CF-1) is ready to be removed by the operator from food loading section 21, as shown in FIG. 5E.

Figure 5F:
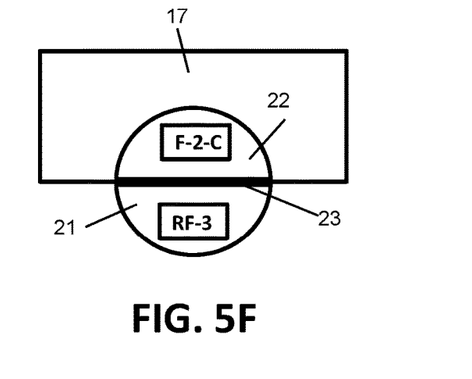

While the second food item is being cooked (F-2-C), a third uncooked raw food item (RF-3) can be placed on food loading section 21, and the operator enters an appropriate cook settings for cooking the third food item via control panel 15, as depicted in FIG. 5F.

The above mentioned sequence can be performed repeatedly for different food items. Since different cooking times can be entered by an operator, any of the above mentioned food items can be completely different from each other.

When the cooking temperature of a to-be-cooked food item is relatively close to the temperature of cavity 17, no adjustment is typically required. When the cooking temperature of a to-be-cooked food item is higher than the temperature of cavity 17, heater 39 (from FIG. 3A) may be turned on, and heated air will be directed to cavity 17 via top blower 32 and bottom blower 33 in order to increase the temperature of cavity 17. The time for heating up cavity 17 should be relatively short (e.g., no wait time) due to the placement of divider 23 within the opening 18.

When the cooking temperature of a to-be-cooked food item is lower than the temperature of cavity 17, it is important to lower the temperature of cavity 17 before starting the cooking process again, or else there may be a risk of overcooking the food item. The time for cooling down cavity 17 to the desired temperature may take several minutes, which is usually not acceptable in a fast pace commercial kitchen. Thus, the temperature of cavity 17 needs to be rapidly lowered by, for example, the following methods. If the newly entered cook temperature is approximately 40° F. (or approximately 10% in ° F.) less than the temperature of cavity 17, cavity 17's temperature can be rapidly lowered by rotating either one of food loading sections 21, 22 into cavity 17. This is because one of food loading sections 21, 22, which has been cooled by the ambient air of a kitchen, can serve as a heat sink to absorb the heat within cavity 17.

Figure 6A:
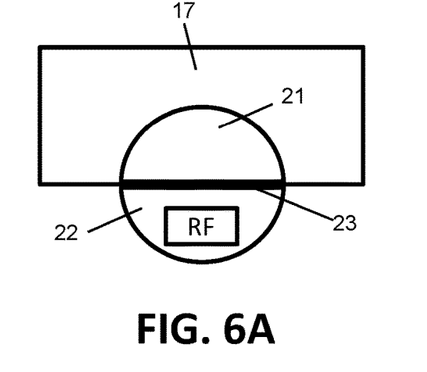
FIGS. 6A-6D illustrate a method of rapidly reducing the temperature of the cavity from FIGS. 2A-2B, in accordance with an exemplary embodiment of the present invention.
Figure 6B:
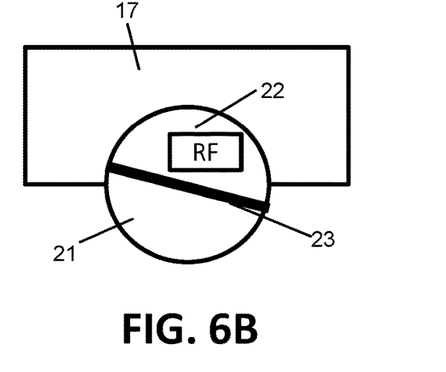
Figure 6C:
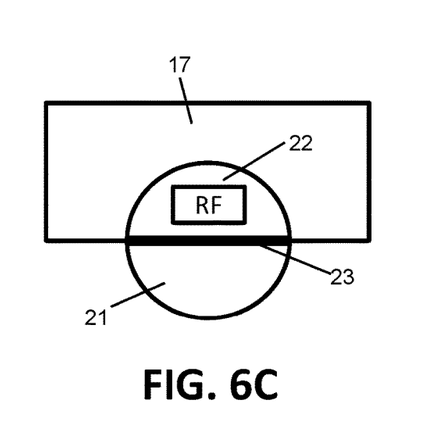

However, if the newly entered cook temperature is substantially lower than the temperature of cavity 17 (such as more than 40° F. or 10% in ° F.), the temperature of cavity 17 needs to be further lowered by using a different method, in conjunction with the usage of one of food loading sections 21, 22 as a heat sink, in order to avoid any overcooking. The temperature of cavity 17 can be further lowered rapidly as follows. Referring now to FIGS. 6A-6D, after a raw food item RF has been placed on loading section 22 (or 21), as depicted in FIG. 6A, a foodservice personnel can enter a desired cook temperature for cooking the food item RF via control panel 16 (or 15) (from FIG. 1). If the desired cook temperature is substantially lower than the temperature of cavity 17, top and/or bottom blowers 32, 33 (from FIG. 3A) may be activated as soon as food loading section 22 (or 21) begins moving into cavity 17. At this point, the forced air from top blower 32 and/or bottom blower 33 push the heated air within cavity 17 out via opening 18, thereby lowering the temperature of cavity 17. Food loading section 22 (or 21) may then be moved partially but not completely within cavity 17 such that opening 18 is not covered by divider 23, as depicted in FIG. 6B. In this position, heated air within cavity 17 is allowed to escape until the temperature of cavity 17 is reduced to the desired temperature, and at which point, food loading section 22 (or 21) is moved completely within cavity 17 with opening 18 completely covered by divider 23, as shown in FIG. 6C.

Figure 6D:
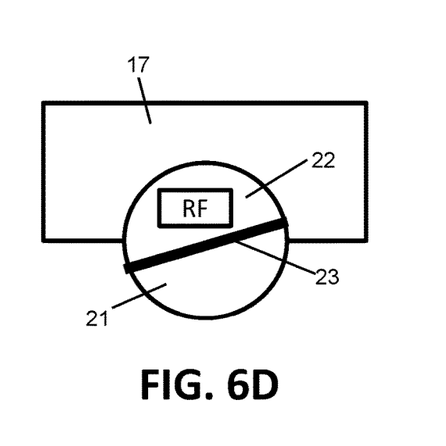

Alternatively, instead of waiting for the temperature of cavity 17 to drop to the desired temperature before the cooking cycle begins, the cooking cycle can start and rotator can oscillate clockwise and counter-clockwise to permit the edges of divider 23 to travel beyond opening 18 such that hot air is allowed to escape from cavity 17, as can be illustrated by rotating food loading section 22 in an oscillatory fashion between the positions shown in FIGS. 6B, 6C, and 6D repeatedly. After the temperature of cavity 17 has been reduced to the desired temperature, the food loading section 22 returns to and stays in the cooking position shown in FIG. 6C. In various embodiments, in order to increase the hot airstream coverage on the food item on the food loading section 22, and to avoid overheating of a food item at any spot located directly underneath and/or above one of the nozzles, the food loading section 22 in the cooking position shown in FIG. 6C may also oscillate in a slight clockwise and counter-clockwise fashion, as described above.

In addition, an interrupt mode can be added to oven 10. For certain food items, a foodservice personnel may require to interrupt the normal cooking cycle by entering a cook temperature that is less than the preset cook temperature of oven 10. If the newly entered cook temperature is approximately within 20% less than the preset cook temperature of oven 10, the process of cooling cavity 17's temperature can be accelerated by using one of food loading sections 21, 22 that has been cooled by ambient air of a kitchen as a heat sink to lower the temperature of cavity 17. For much of the duration of the cook cycle, the preset temperature of oven 10 at which the temperature feedback loop operates is temporarily lowered to the new temperature entered by the foodservice personnel. Once the cook cycle is near completion, the preset temperature of oven 10 reverts back to the original preset temperature so that the next cooking cycle will not start from an unacceptably low starting temperature.

As has been described, the present invention provides an oven having a rotating door for continuously and efficiently cooking a wide variety of food items while minimizing heat loss resulting in improved energy efficiency.

While this invention has been described in conjunction with exemplary embodiments outlined above and illustrated in the drawings, it is evident that many alternatives, modifications and variations in form and detail will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A method of cooking food items in an oven,
the oven comprising an oven cavity, an opening for loading a food item into the oven cavity, a control panel for entering a cook setting of the oven, and a rotatable surface having a divider for dividing the rotatable surface into a first food loading section and a second food loading section, wherein one of the first food loading section and the second food loading section is located outside the oven cavity and the divider substantially blocks the opening when the other one of the first food loading section and the second food loading section is located within the oven cavity,
the method comprising the steps of:

placing a first food item in the first food loading section when the first food loading section is located outside the oven cavity;
entering a first cook setting for the first food item into the control panel;
rotating the rotatable surface to place the first food loading section within the oven cavity;
initiating a first cooking operation based on the first cook setting when the first food item is placed within the oven cavity;
placing a second food item in the second food loading section when the second food loading section is located outside the oven cavity and the first food item is placed within the oven cavity;
entering a second cook setting for the second food item into the control panel, while the second food item is located outside the oven cavity and the first food item is placed within the oven cavity;
after completion of the first cooking operation, rotating the rotatable surface to place the first food loading section outside the oven cavity and the second food loading section within the oven cavity;
initiating a second cooking operation based on the second cook setting when the second food item is placed within the oven cavity; and
removing the first food item from the first food loading section.

2. The method of claim 1, further comprising the steps of:
after removal of the first food item from the first food loading section, placing a third food item in the first food loading section when the first food loading section is located outside the oven cavity and the second food item is placed within the oven cavity; and
entering a third cook setting for the third food item into the control panel, while the third food item is located outside the oven cavity and the second food item is placed within the oven cavity.

3. The method of claim 1, wherein the step of initiating a first cooking operation comprises rotating the cooking surface clockwise and counter-clockwise in an oscillatory fashion within the width of the divider during the first cooking operation.

4. The method of claim 1, wherein the step of rotating the rotatable surface to place the first food loading section within the oven cavity comprises using a blower to force heated air within the oven cavity to exit through the opening before starting the first cooking operation.

5. The method of claim 1, wherein the step of initiating a first cooking operation comprises rotating the cooking surface clockwise and counter-clockwise in an oscillatory fashion to allow edges of the divider to travel beyond the opening to allow hot air to escape from the oven cavity during an initial portion of the first cooking operation.

6. A method of cooking food items in an oven,
the oven comprising an oven cavity and a rotator having a first food loading section and a second food loading section, wherein one of the first food loading section and the second food loading section is located substantially outside the oven cavity when the other one of the first food loading section and the second food loading section is located substantially within the oven cavity, the method comprising the steps of:
placing a first food item in the first food loading section when the first food loading section is located substantially outside the oven cavity;
transporting the first food item into the oven cavity by rotating the rotator;
cooking the first food item placed within the oven cavity using a first cook setting;
placing a second food item in the second food loading section when the second food loading section is located substantially outside the oven cavity and the first food item is placed substantially within the oven cavity;
after finishing cooking the first food item, transporting the first food item out of the oven cavity and the second food item into the oven cavity by rotating the rotator; and
cooking the second food item placed within the oven cavity using a second cook setting,
wherein the first cook setting and the second cook setting are independently controllable.

7. The method of claim 6, further comprising the steps of:
removing the first food item from the first food loading section;
placing a third food item in the first food loading section when the first food loading section is located substantially outside the oven cavity and the second food item is placed substantially within the oven cavity;
after finishing cooking the second food item, transporting the second food item out of the oven cavity and the third food item into the oven cavity by rotating the rotator; and
cooking the third food item placed within the oven cavity using a third cook setting,
wherein the second cook setting and the third cook setting are independently controllable.

8. The method of claim 6, wherein the step of cooking the first food item comprises rotating the rotator clockwise and counter-clockwise in an oscillatory fashion to avoid overheating any spot of the first food item.

9. The method of claim 6, wherein the step of transporting the first food item into the oven cavity comprises using a blower to force heated air within the oven cavity to exit through the opening before starting cooking the first food item.

10. The method of claim 6, wherein the step of rotating the rotator comprises using a motor.

11. The method of claim 6, wherein the step of cooking the first food item comprises closing the opening of the oven cavity.

12. The method of claim 11, wherein the step of closing the opening comprises closing the opening with a divider placed on the rotator, the divider separating the first food loading section and the second food loading section in the rotator.

13. The method of claim 12, wherein the step of cooking the first food item further comprises rotating the rotator clockwise and counter-clockwise in an oscillatory fashion to allow edges of the divider to travel beyond the opening to allow hot air to escape from the oven cavity at an initial stage of cooking the first food item.

* * * * *